United States Patent [19]

Matsumura et al.

[11] Patent Number: 5,747,772
[45] Date of Patent: May 5, 1998

[54] LASER MARKING METHOD INCLUDING RASTER SCANNING OF RAPIDLY REWRITTEN LIQUID CRYSTAL MASK

[75] Inventors: Yukinori Matsumura, Isehara; Hirokazu Tanaka, Hiratsuka, both of Japan

[73] Assignee: Komatsu Ltd., Kanagawa, Japan

[21] Appl. No.: 793,830

[22] PCT Filed: Jun. 2, 1995

[86] PCT No.: PCT/JP95/01087

§ 371 Date: Feb. 18, 1997

§ 102(e) Date: Feb. 18, 1997

[87] PCT Pub. No.: WO96/05936

PCT Pub. Date: Feb. 29, 1996

[30] Foreign Application Priority Data

Aug. 19, 1994  [JP]  Japan .................. 6-195559

[51] Int. Cl.$^6$ .................................. B23K 26/06
[52] U.S. Cl. .................. 219/121.85; 219/121.69; 219/121.73; 349/2
[58] Field of Search ............ 219/121.68, 121.69, 219/121.73, 121.8, 121.85; 347/255, 256, 260; 349/2, 3, 4, 19, 22, 33; 359/227; 345/50, 87

[56] References Cited

U.S. PATENT DOCUMENTS

| | | |
|---|---|---|
| 5,231,263 | 7/1993 | Kuwabara et al. .......... 219/121.68 |
| 5,309,273 | 5/1994 | Mori et al. .......... 359/202 |
| 5,587,094 | 12/1996 | Yoshida et al. .......... 219/121.68 |
| 5,605,641 | 2/1997 | Chiba et al. .......... 219/121.68 |
| 5,608,563 | 3/1997 | Matsumura et al. .......... 359/202 |

FOREIGN PATENT DOCUMENTS

| | | | |
|---|---|---|---|
| 02268988 A | 11/1990 | Japan . | |
| 2-268988 | 11/1990 | Japan . | |
| 3-18491 | 1/1991 | Japan | 219/121.8 |
| 4-251683 | 9/1992 | Japan | 219/121.68 |
| 6-39577 | 2/1994 | Japan | 219/121.73 |
| 6-142951 | 5/1994 | Japan | 219/121.68 |
| 06155054 A | 6/1994 | Japan . | |
| 6-155054 | 6/1994 | Japan . | |

*Primary Examiner*—Teresa J. Walberg
*Assistant Examiner*—Gregory L. Mills
*Attorney, Agent, or Firm*—Welsh & Katz, Ltd.

[57] ABSTRACT

The invention relates to a laser marking method in which a laser beam is used for raster scanning of a liquid-crystal mask, on which a desired marking pattern is formed and the laser beam passing through the liquid-crystal mask gives a marking to an object. A marking pattern on the liquid-crystal mask is successively switched over to a subsequent marking pattern every scanning line, to reduce variation in transmissivity of the liquid-crystal mask, thereby obtaining marking with less unevenness of image.

4 Claims, 6 Drawing Sheets

LASER MARKING METHOD INCLUDING RASTER SCANNING OF RAPIDLY REWRITTEN LIQUID CRYSTAL MASK

TECHNICAL FIELD

The present invention relates to a method of laser marking wherein a marking pattern is marked onto an object such as an IC by means of a laser beam passing through a liquid crystal mask, by raster-scanning the laser beam over this liquid crystal mask on which a desired marking pattern is displayed, and more particularly to a method of reducing image unevenness by decreasing the variation of the transmissivity of the liquid crystal.

BACKGROUND ART

In a laser marking system using a liquid crystal mask, a required marking pattern is displayed on the liquid crystal mask and this marking pattern is marked onto an object by irradiating the object with the laser beam through the liquid crystal mask. The laser beam is made to scan over the liquid crystal mask by so-called raster scanning produced by main scanning and auxiliary scanning.

Japanese Patent Publication No. H. 2-268988 discloses a conventional laser marking device of this type.

In this conventional art, as shown in FIG. 8, the liquid crystal mask is divided into a plurality of blocks and the time required for the laser beam to perform scanning from the starting point to the end point is measured beforehand for each block, and re-writing of the marking pattern is performed in unit of each division by detecting the lapsed time after the commencement of scanning by means of a timer etc. For example, if the liquid crystal mask is divided into two divisions, laser scanning of the lower division is performed after completion of laser scanning of the upper division and the marking pattern displayed in the upper division is concurrently switched over to the subsequent marking pattern.

In this way, re-writing of the liquid crystal mask and laser scanning are carried out in parallel, so the time required for the marking process can be shortened compared with the case where changeover of the display pattern of the liquid crystal mask to the subsequent marking pattern is only effected after completing the laser scanning of the entire liquid crystal.

However, in the conventional art described above, the divided block units are of comparatively large area so variation in the transmissivity and temperature occurs between liquid crystal pixels in the same divided block, causing unevenness of the image produced by marking.

In more detail, even within the same block, there is a considerable difference between the upper region and the lower region in the time that elapses from the time-point of changeover of the liquid crystal until scanning is performed; this time difference causes unevenness of transmissivity. For example, in FIG. 8 referred to above, considering liquid crystal pixels a and b of block A, although the time-point at which the marking pattern of these pixels a, b is switched over is the same, since the laser is scanned in raster scanning from the top left to the bottom right, the time-point of the laser scanning in respect of pixel a is considerably earlier than the time-point of the laser scanning in respect of pixel b. This therefore results in a large difference between pixels a and b as regards the lapsed times from the time-point of liquid crystal changeover until laser scanning is performed; this causes variation of the transmissivity.

FIG. 9 shows the liquid crystal transmissivity characteristic. As can be seen from this Figure, the liquid crystal transmissivity reaches a prescribed transmissivity on the lapse of a prescribed time after the drive voltage is turned on, but thereafter gradually rises as the time for which the voltage is kept on gets longer.

Thus, by making the time for which the liquid crystal is maintained in the on condition after the voltage being turned on fixed as far as possible, the transmissivity of the liquid crystal can be fixed.

With the foregoing in view, it is an object of the present invention to provide a laser marking method wherein the variation of transmissivity of the liquid crystal is reduced so as to enable marking to be performed with little unevenness of the image.

DISCLOSURE OF THE INVENTION

According to the present invention, in a laser marking method in which raster scanning of a laser beam is performed over a liquid crystal mask on which a required marking pattern is displayed, so that an object is marked by the laser beam passing through the liquid crystal, the marking pattern of the liquid crystal mask is successively switched over to the subsequent marking pattern in unit of a scanning line at which the scanning of the laser beam is completed.

That is, according to the present invention, changeover of the display pattern of the liquid crystal mask is effected in unit of a single scanning line for every scanning line at which the scanning of the laser beam is completed.

Also according to another aspect of the present invention, in a laser marking method in which raster scanning of a laser beam is performed over a liquid crystal mask on which a required marking pattern is displayed, so that an object is marked by the laser beam passing through the liquid crystal, the marking pattern of the liquid crystal mask is successively switched over to the subsequent marking pattern in unit of a liquid crystal pixel at which the scanning of the laser beam is completed.

That is, according to another aspect of the present invention, changeover of the display pattern of the liquid crystal mask is effected in unit of a single pixel for every liquid crystal pixel at which the scanning of the laser beam is completed.

Consequently, with the present invention, since laser scanning is performed with the liquid crystal display pattern being switched over with unit of one main scanning line or one pixel, variation of transmissivity of the pixels of the liquid crystal mask can be reduced, enabling marking to be performed with little unevenness of the image.

BEST MODE FOR CARRYING OUT THE INVENTION

The present invention is described in detail below with reference to embodiments shown in the accompanying drawings.

Figure 2:
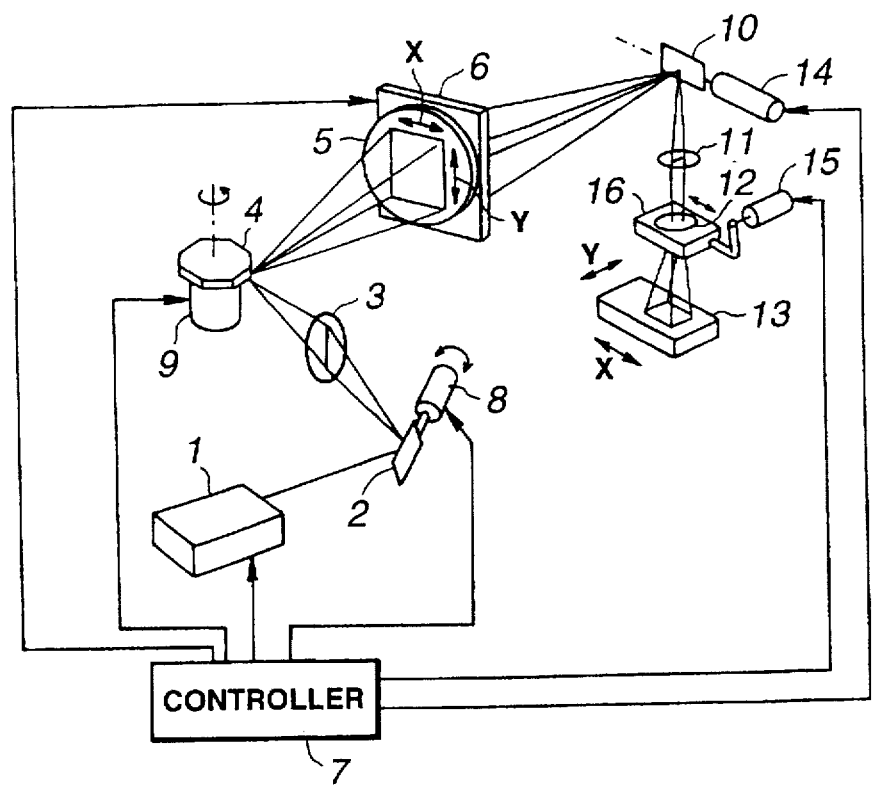
FIG. 2 is a diagram showing the overall construction of a laser marker device.

FIG. 2 shows an example of the overall construction of a laser marker device to which the method of the present invention is applied. Laser light generated by a laser oscillator 1 is directed onto a liquid crystal mask 6 through a Y-direction deflector constituted by a scanner mirror 2, a lens 3, an X-direction deflector constituted by a polygonal mirror 4, and a lens 5. With this construction, raster scanning of the laser light over liquid crystal mask 6 is performed by means of the auxiliary scanning (Y-direction) achieved by scanner mirror 2 and the main scanning (X-direction) achieved by polygonal mirror 4.

Controller 7 controls the raster scanning over liquid crystal mask 6 by controlling a motor 8 for the scanner mirror and a motor 9 for the polygonal mirror and also controls the laser oscillation generated by the laser oscillator 1. In addition, controller 7 executes display changeover control of the marking pattern on liquid crystal mask 6.

The laser light that has passed through liquid crystal mask 6 is directed onto object 13 through Y-direction detector constituted by mirror 10, lens 11, and X-direction deflector constituted by lens 12 equipped with a moving table; the marking pattern that is displayed on liquid crystal mask 6 is thereby marked onto object 13. The Y-direction deflector constituted by mirror 10 deflects the laser light in the Y direction by being driven in rotation by motor 14 and the X-direction deflector constituted by lens 12 deflects the laser light in the X direction by displacement of moving table 16 produced by motor 15. This mirror 10 and lens 12 are provided to effect positional alignment of the laser beam with respect to object 13, positional alignment control of these components being performed by controller 7.

Figure 1:
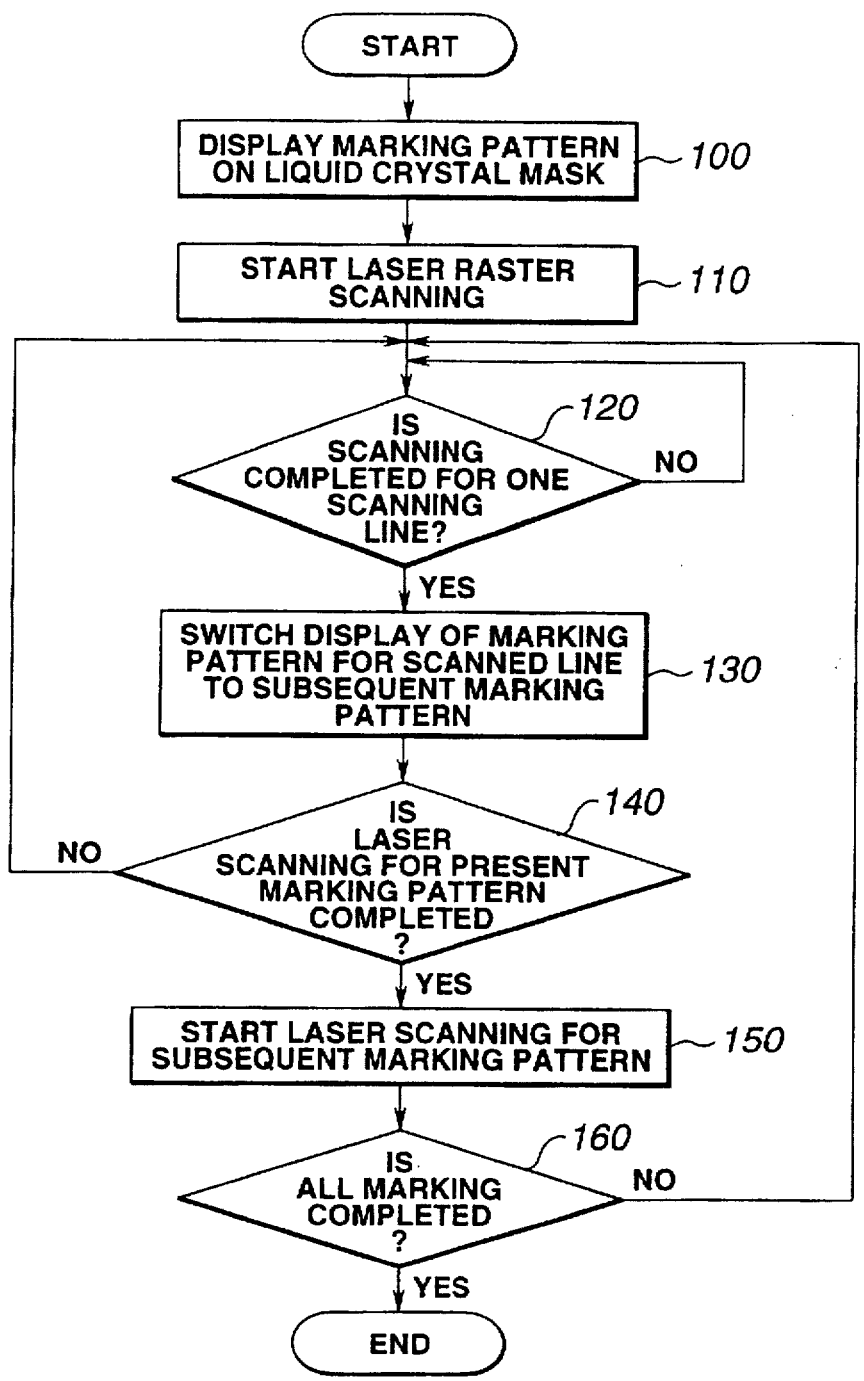
FIG. 1 is a flow chart showing an embodiment of the present invention.

In this construction, controller 7 executes laser scanning control and marking pattern display changeover control as shown by the flow-chart of FIG. 1.

First of all, by driving liquid crystal mask 6, controller 7 displays on liquid crystal mask 6 the marking pattern with which marking is to be initially effected (step 100)

Figure 3:
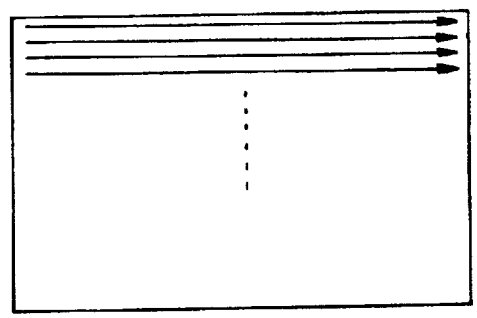
FIG. 3 is a view showing raster scanning.

Next, controller 7 turns laser oscillator 1 on and commences raster scanning of the laser light as shown in FIG. 3 by controlling motor 8 and 9 (step 110).

After this, when controller 7 detects completion of raster scanning of one main scanning line (step 120), raster scanning shifts to the subsequent main scanning line and liquid crystal mask 6 is driven (step 130) such as to switch over the marking pattern in respect of the main scanning line at which the raster scanning is completed to the marking pattern that is to be displayed next.

Subsequently in the same way, every time controller 7 completes raster scanning of one main scanning line, raster scanning is shifted to the subsequent main scanning line and liquid crystal mask 6 is driven (step 140–step 130) such as to switch over the marking pattern in respect of the main scanning line at which the raster scanning is completed to the marking pattern that is to be displayed next.

After this, when laser scanning of the present marking pattern is completed (step 140), controller 7 switches the marking position on the object by driving motors 14 and 15, and raster scanning of liquid crystal mask 6 is again performed, thereby marking the object with the subsequent marking pattern (step 150).

The same control is executed repeatedly until all marking has been completed (step 160).

Figure 4:
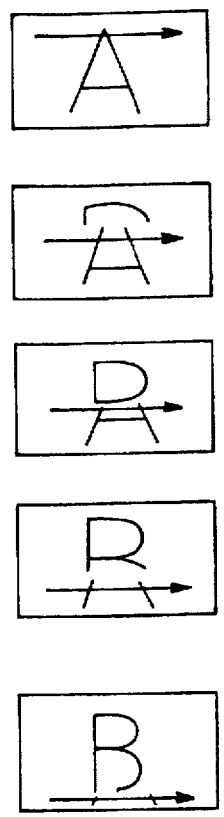
FIG. 4 is a view showing changeover of the marking pattern with a single scanning line as unit.

FIG. 4 shows how the marking pattern of the liquid crystal mask is switched over in unit of a single main scanning line. Changeover from an initial scanning pattern "A" to the subsequent scanning pattern "B" in unit of one main scanning line is shown.

Figure 5:
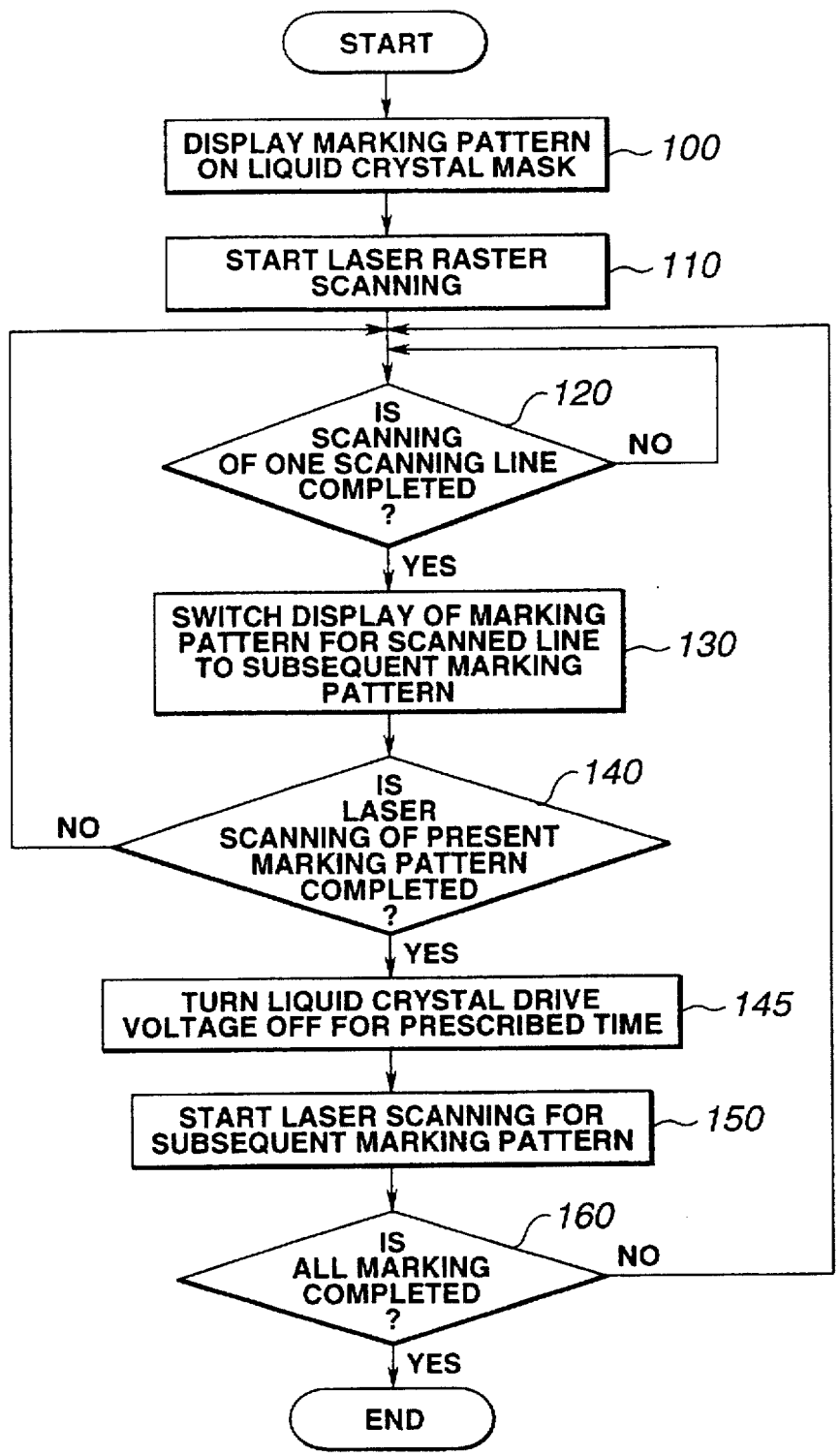
FIG. 5 is a flow chart showing a further embodiment of the present invention.

FIG. 5 shows another embodiment of the present invention, in which a step 145 is inserted between step 140 and step 150 of the flow chart indicated in FIG. 1.

Specifically, in this embodiment, on completion of laser scanning of a given marking pattern and before starting laser scanning of the subsequent marking pattern, the liquid crystal drive voltage of the liquid crystal panel is temporarily turned off for a prescribed time, the liquid crystal being driven in accordance with the subsequent marking pattern only after this prescribed off time has elapsed.

Figure 6A:
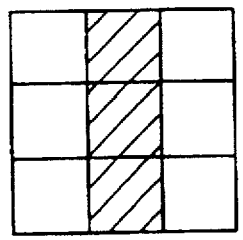
FIGS. 6(a), 6(b) and 6(c) are views given in explanation of the embodiment of FIG. 5.
Figure 6B:
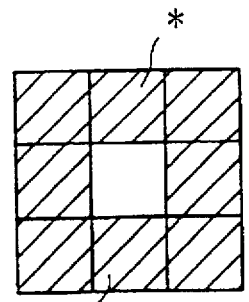
Figure 6C:
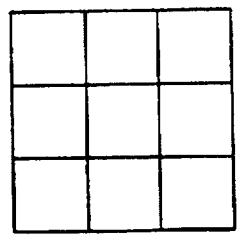

For example, when the display content is switched over to a pattern as shown in FIG. 6(b) from the pattern shown in FIG. 6(a), with the conventional system, the two pixels indicated by "*" would be successively in the on condition, resulting in the difference in transmissivity from that of other portions so as to give rise to unevenness of the image. In this embodiment, on the other hand, as shown in FIG. 6(c), the transmissivity of the pixel elements is made practically uniform by inserting a step in which the drive voltage of the entire device is turned off for a prescribed time, thereby reducing unevenness of the image. More specifically, in this embodiment, the marking pattern is switched over in the order (a)→(b)→(c)→(b).

Figure 7:
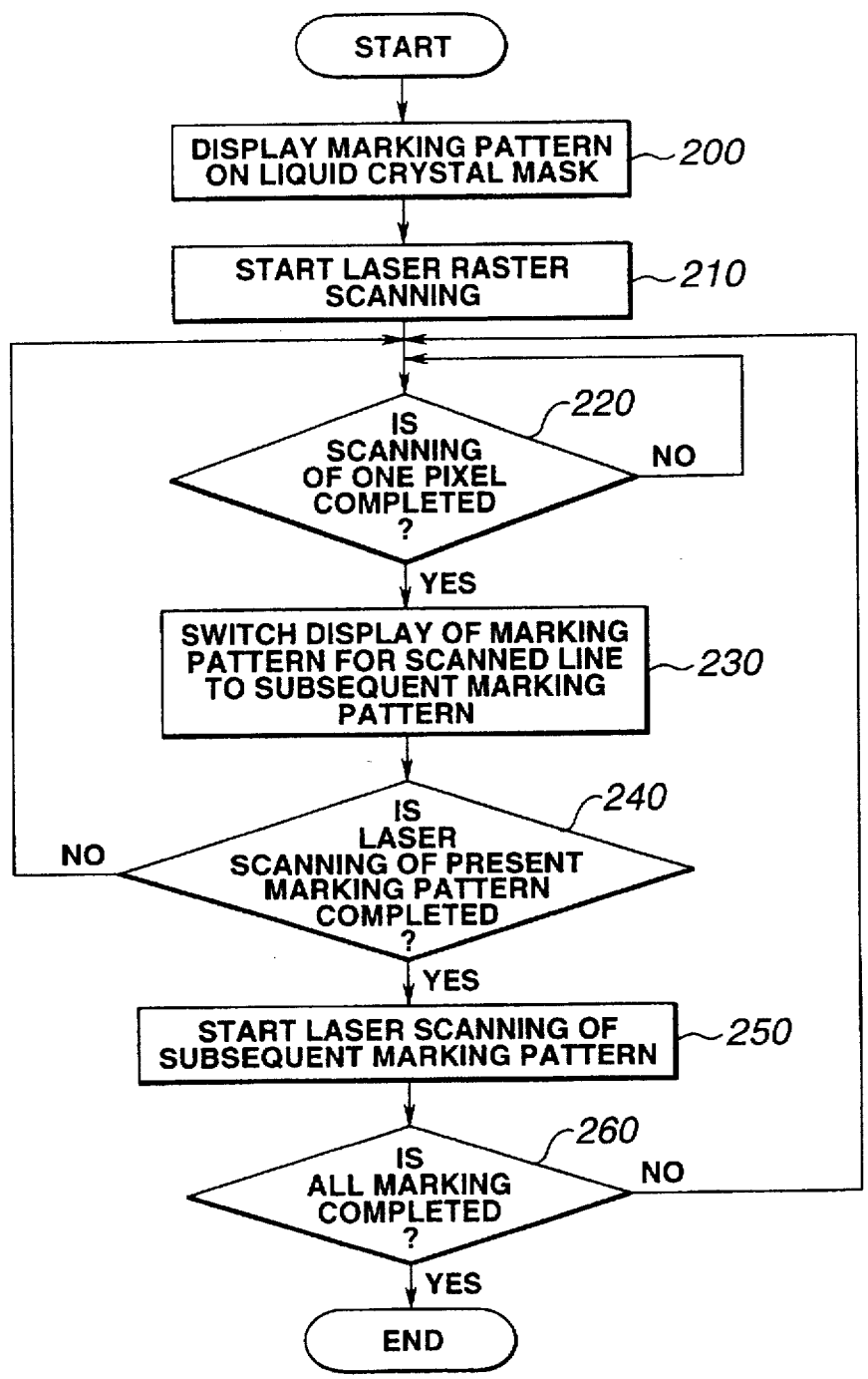
FIG. 7 is a flow chart showing a further embodiment of the present invention.
Figure 8:
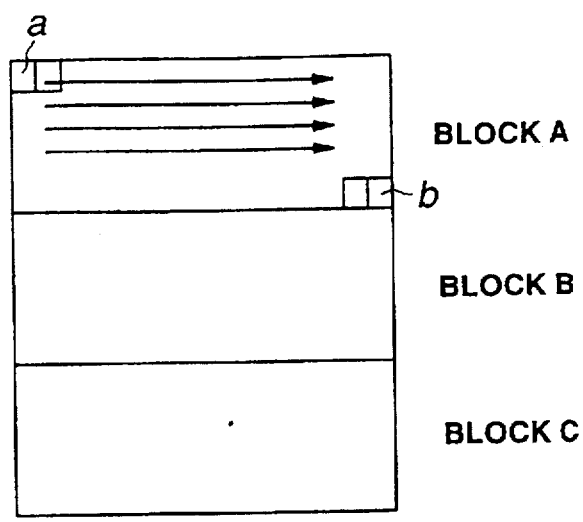
FIG. 8 is a view given in explanation of the conventional art.
Figure 9:
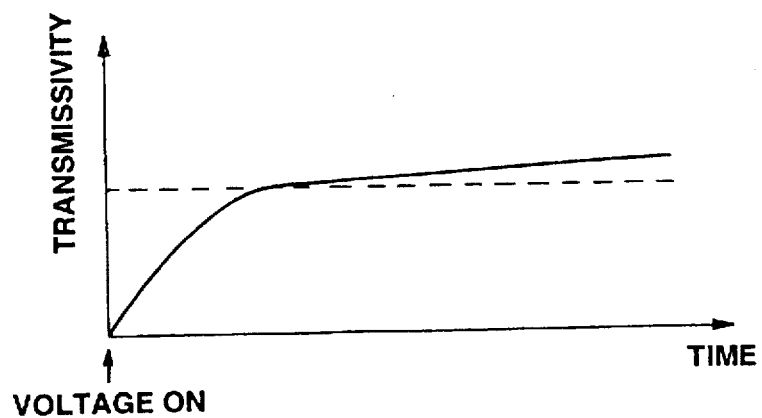
FIG. 9 is a view showing the change in the liquid crystal transmissivity with time.

FIG. 7 shows a still another embodiment of the present invention. In this embodiment, the display of the marking pattern is switched over in unit of one liquid crystal pixel.

Specifically, first, controller 7 drives liquid crystal mask 6 to display thereon the marking pattern with which marking is to be initially effected (step 200).

Next, controller 7 turns laser oscillator 1 on and controls the drive of motor 8 and 9 so as to commence raster scanning by the laser light as shown in FIG. 3 (step 210).

After this, when controller 7 completes laser scanning of one liquid crystal pixel (step 220), laser scanning shifts to the subsequent pixel and liquid crystal mask 6 is driven such as to switch over the marking pattern in respect of the one pixel whose laser scanning has just been performed to the marking pattern that is to be displayed next (step 230).

Subsequently in the same way, every time controller 7 completes laser scanning of one pixel, laser scanning is shifted to the subsequent pixel and liquid crystal mask 6 is driven such as to switch over the marking pattern in respect of the pixel at which the laser scanning is completed to the marking pattern that is to be displayed next (step 240–step 230).

After this, when laser scanning of the present marking pattern is completed (step 240), controller 7 switches the marking position on the object by driving motors 14 and 15, and raster scanning of liquid crystal mask 6 is again performed, thereby marking the object with the subsequent marking pattern (step 250).

The same control is executed repeatedly until all marking has been completed (step 260).

It should be noted that, even in the embodiment of FIG. 7, as in the embodiment of FIG. 5, it would be possible to insert a voltage off step, i.e. a step in which the liquid crystal drive voltage is turned off for a prescribed time, between step 240 and step 250.

Also, although in the above embodiment it was arranged for the marking pattern to be switched over with a unit of one pixel, it would be possible to switch over the marking pattern in unit of a few pixels or a few tens of pixels or a few hundred pixels.

INDUSTRIAL APPLICABILITY

In a method of laser marking in which a marking pattern is marked onto an object such as an IC by a laser beam that passes through a liquid crystal mask, the present invention is effective in making it possible to obtain marking with little unevenness of the image.

We claim:

1. A method of laser marking in which a laser beam is raster-scanned over a liquid crystal mask on which a required marking pattern is displayed and an object is marked by the laser beam that has passed through the liquid crystal mask, wherein each scanning line of the liquid crystal mask is scanned by the laser beam while displaying a first marking pattern, each scanning line being switched to display a second marking pattern directly after being scanned by the laser beam.

2. A method of laser marking according to claim 1, in which on completion of changeover of the marking pattern of the liquid crystal mask of the subsequent pattern and before starting laser beam scanning of the subsequent pattern, a liquid crystal drive voltage is temporarily turned off for a prescribed time, and thereafter the liquid crystal is driven in accordance with the subsequent pattern.

3. A method of laser marking in which a laser beam is raster-scanned over a liquid crystal mask on which a required marking pattern is displayed and an object is marked by the laser beam that has passed through the liquid crystal mask, wherein each scanning line of the liquid crystal mask is scanned by the laser beam while displaying a first marking pattern, each scanning line being switched to display a second marking pattern in the form of a liquid crystal pixel after being scanned by the laser beam.

4. A method of laser marking according to claim 3, in which on completion of changeover of the marking pattern of the liquid crystal mask of the subsequent pattern and before starting laser beam scanning of the subsequent pattern, a liquid crystal drive voltage is temporarily turned off for a prescribed time and thereafter the liquid crystal is driven in accordance with the subsequent pattern.

* * * * *